United States Patent
Fried et al.

(10) Patent No.: US 7,895,571 B2
(45) Date of Patent: Feb. 22, 2011

(54) METHOD AND APPARATUS FOR RESOLVING CLIENT-SIDE LOGIC

(75) Inventors: Eric Philip Fried, Austin, TX (US);
John Richard Houlihan, Round Rock, TX (US); Kevin William Monroe, Austin, TX (US); Jorge D. Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1064 days.

(21) Appl. No.: 11/627,106

(22) Filed: Jan. 25, 2007

(65) Prior Publication Data

US 2008/0184199 A1 Jul. 31, 2008

(51) Int. Cl.
*G06F 9/44* (2006.01)
(52) U.S. Cl. .................. 717/115; 717/113; 717/120; 717/135
(58) Field of Classification Search .................. 717/115
See application file for complete search history.

(56) References Cited

U.S. PATENT DOCUMENTS

| | | | | |
|---|---|---|---|---|
| 6,604,209 | B1 * | 8/2003 | Grucci et al. ................. | 714/38 |
| 6,697,849 | B1 * | 2/2004 | Carlson ....................... | 709/219 |
| 6,766,333 | B1 * | 7/2004 | Wu et al. ........................... | 1/1 |
| 6,766,477 | B2 * | 7/2004 | Grucci et al. ................. | 714/38 |
| 7,672,938 | B2 * | 3/2010 | Hawkins ...................... | 709/203 |
| 2003/0009488 | A1 * | 1/2003 | Hart, III ...................... | 707/500 |
| 2006/0020883 | A1 * | 1/2006 | Kothari et al. ............... | 715/513 |
| 2006/0112372 | A1 * | 5/2006 | Wang et al. .................. | 717/116 |
| 2006/0184913 | A1 * | 8/2006 | Coulthard et al. ........... | 717/104 |
| 2006/0248166 | A1 * | 11/2006 | Milosevic et al. ........... | 709/219 |

OTHER PUBLICATIONS

Hightower, "JSF for non believers: The JSF application lifecycle", Mar. 1, 2005, pp. 1-20, retrieved Dec. 7, 2006. http://www-128.ibm.com/developerworks/java/library/j-jsf2/.
Geary, "A first look at JavaServer Faces, Part 1", JavaWorld, Nov. 29, 2002, pp. 1-11, retrieved Dec. 7, 2006. http://www.javaworld.com/cgi-bin/mailto/x_java.cgi.

* cited by examiner

*Primary Examiner*—Thomas K Pham
(74) *Attorney, Agent, or Firm*—Yee & Associates, P.C.; Justin M. Dillon

(57) ABSTRACT

A computer implemented method, an apparatus, and a computer usable program product for rendering client-side logic in a webpage when the webpage is rendered is provided. A webpage development framework initiates a script component built in a component library of a webpage development framework, wherein the script component is subject to a lifecycle of the webpage development framework. The webpage development framework defines at least one webpage attribute using at least one value-binding expression in the script component, wherein the at least one value-binding expression provides access to a server-side data model. The webpage development framework then evaluates the at least one value-binding expression, wherein the at least one value-binding expression comprises a current value for the server-side data model.

18 Claims, 3 Drawing Sheets

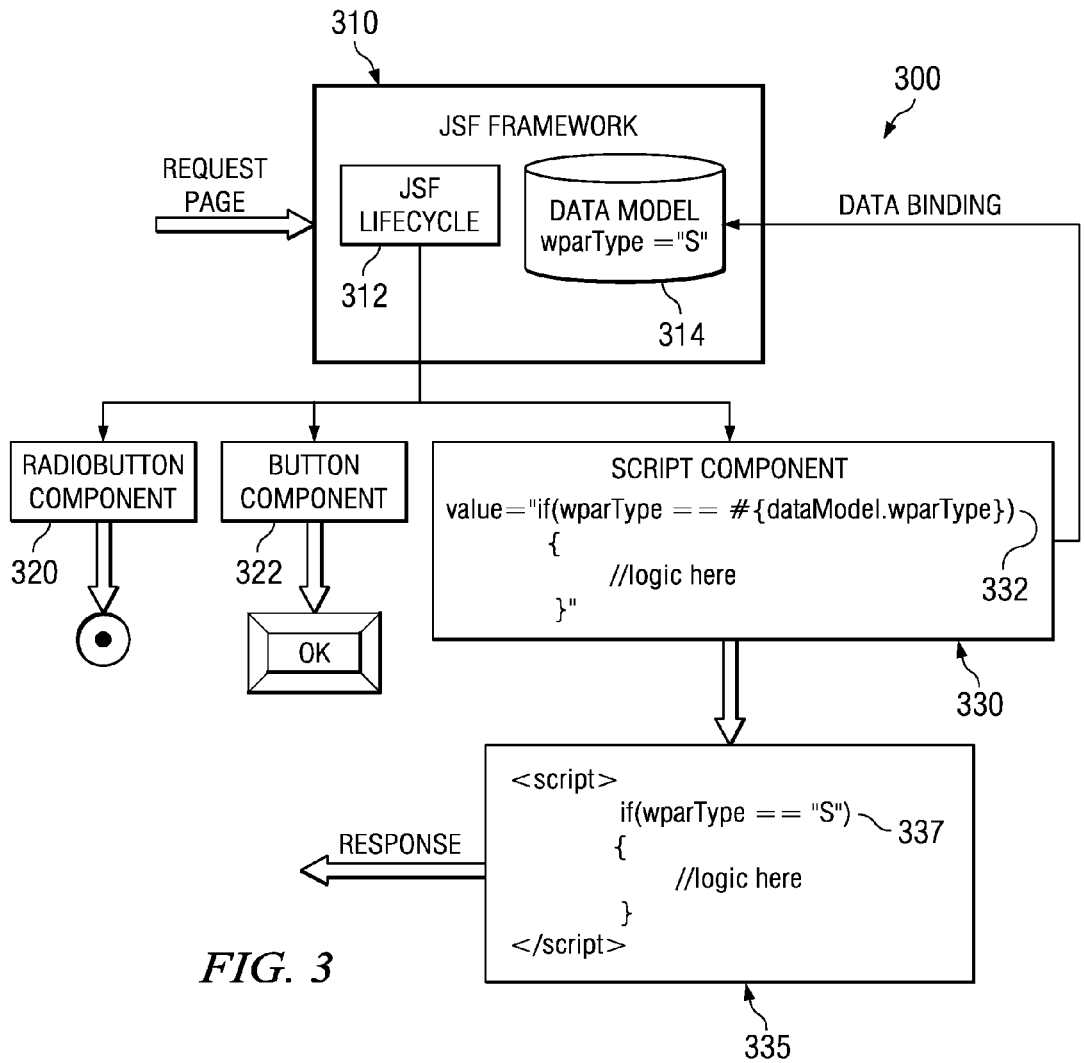

METHOD AND APPARATUS FOR RESOLVING CLIENT-SIDE LOGIC

BACKGROUND OF THE INVENTION

1. Field of the Invention

The present invention relates generally to an improved data processing system, and in particular to a method an apparatus for rendering a webpage. Still more specifically, the present invention provides a computer implemented method, an apparatus, and a computer usable program product for resolving client-side logic in a webpage when the webpage is rendered.

2. Description of the Related Art

Client-side logic is a set of computer usable program code or computer instructions that is executed in a client computer. For example, in a webpage, client-side logic executes the processes for presenting a webpage to the client who requested the page. Client-side logic can also be used to execute processes within the webpage, such as the effects of a client pressing a button or hitting a hyperlink in the webpage.

Typically, client-side logic is resolved when a webpage is built or created on the server that supports the webpage. When a request for a webpage is made by a client, the server supporting the webpage processes the request. When processing the request, the server resolves or assigns values for each attribute that the client-side logic defines. Thus, if a client-side logic defines a button on the webpage, the values associated with the button are determined by the server prior to sending the response to a client.

A webpage development framework is an application in a server that processes a client's request for a webpage. A webpage development framework allows a web developer to create a new webpage as well as to manage the new webpage. An example webpage development framework is JavaServer™ Faces.

In a webpage development framework, a request is subject to the lifecycle of the framework. The lifecycle is typically the different steps or stages used to process a request for a webpage. In a lifecycle, a period of time typically exists between when a page is built and when the webpage is actually rendered or presented to a user. Typically, values for an attribute are assigned no later than when the webpage is built in the webpage development framework. Therefore, any changes in a value received in the time period between when a webpage is built and when the webpage is rendered is not included in the response to the client's request.

SUMMARY OF THE INVENTION

A computer implemented method, an apparatus, and a computer usable program product for rendering client-side logic in a webpage when the webpage is rendered is provided. A webpage development framework initiates a script component built in a component library of a webpage development framework, wherein the script component is subject to a lifecycle of the webpage development framework. The webpage development framework defines at least one webpage attribute using at least one value-binding expression in the script component, wherein the at least one value-binding expression provides access to a server-side data model. The webpage development framework then evaluates the at least one value-binding expression, wherein the at least one value-binding expression comprises a current value for the server-side data model.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 illustrates a script component in a JavaServer™ Faces framework in a data processing system, in accordance with an illustrative embodiment of the present invention;

FIG. 4 depicts an example of scripting language in a script component, in accordance with an illustrative embodiment.

DETAILED DESCRIPTION OF THE PREFERRED EMBODIMENT

Figure 1:
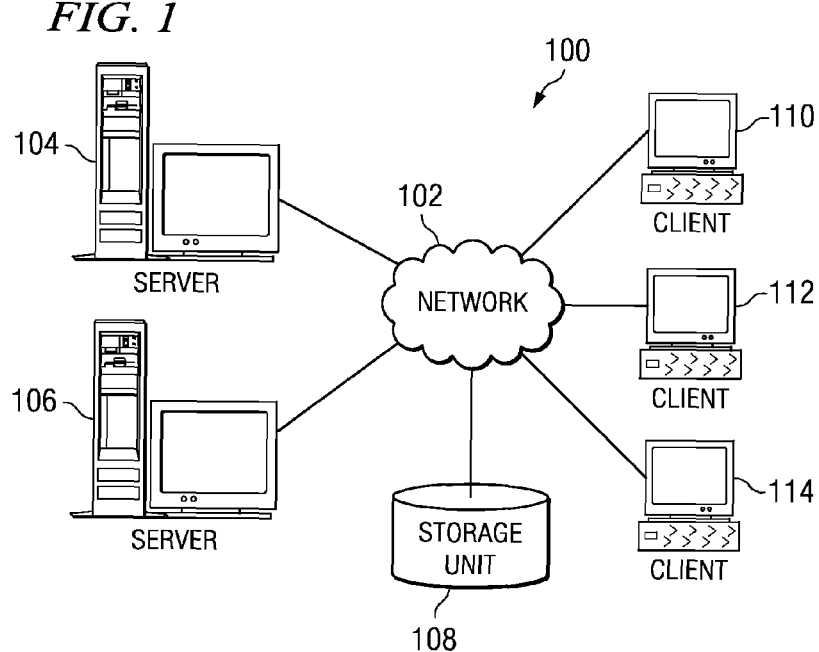
FIG. 1 is a pictorial representation of a network of data processing systems, in which illustrative embodiments may be implemented.
Figure 2:
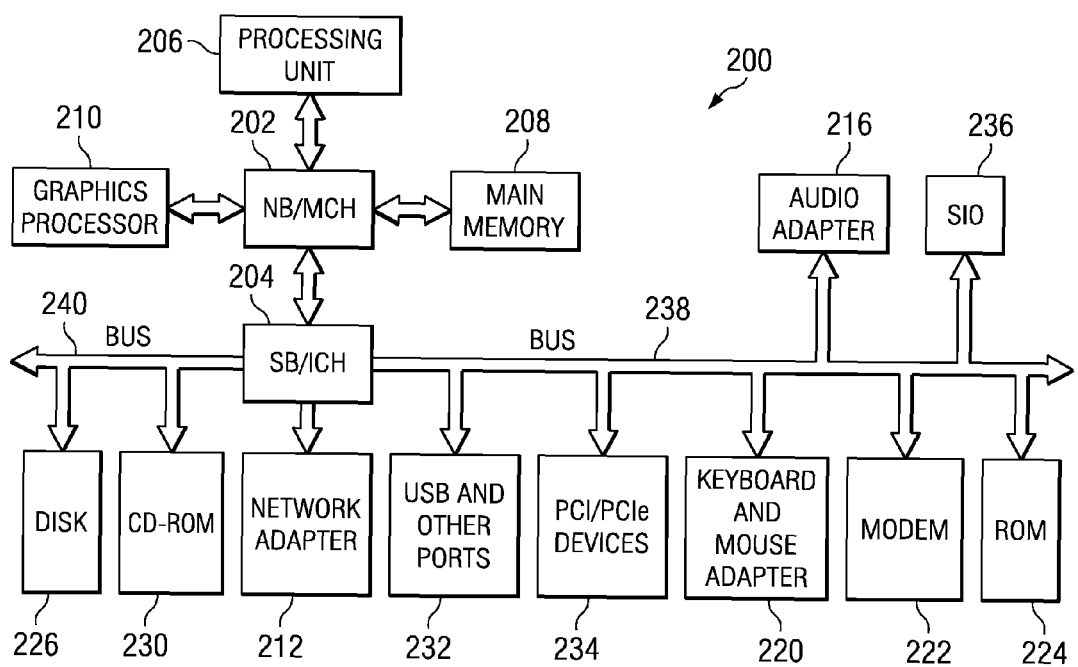
FIG. 2 is a block diagram of a data processing system, in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications, to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP. Microsoft and Windows are trademarks of Microsoft Corporation in the United States, other countries, or both. An object-oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and the above-described examples are not meant to imply architectural limitations. For example, data processing system 200 also may be a tablet computer, a laptop computer, or a telephone device in addition to taking the form of a PDA.

A computer implemented method, an apparatus, and a computer usable program product for rendering client-side logic in a webpage when the webpage is rendered is provided. A webpage development framework initiates a script component built in a component library of a webpage development framework, wherein the script component is subject to a lifecycle of the webpage development framework. The component library comprises a set of computer usable program code currently existing in the webpage development framework.

The lifecycle of the webpage development framework includes restoring a view of a webpage requested by a client. The step of restoring is either building a new view or building a last presented view of the webpage. The second step of the lifecycle is to apply a last presented value for each attribute in the view. The last presented value is a value of the at least one attribute when the webpage was last rendered. The next step of the lifecycle is to validate the last presented value for each attribute in the view against the validation rules. The validation rules define the data type to be input into each attribute. The next step of the lifecycle includes updating the last presented value for each attribute. The webpage development framework obtains the current value from a server-side data model.

The webpage development framework defines at least one webpage attribute using at least one value-binding expression in the script component. The at least one value-binding expression provides access to a server-side data model. To provide access, the at least one value-binding expression binds a value in the at least one value-binding expression to a server-side data model.

The webpage development framework evaluates the at least one value-binding expression. The at least one value-binding expression includes a current value for the server-side data model. In response to evaluating the value-binding expression, the webpage development framework determines whether a scripting language should be rendered. In response to rendering the determination, the scripting language is rendered by extracting the current value from the server-side data model. The scripting language then inserts the current value into the value-binding expression. The rendering of the scripting language occurs when a response to a request for a webpage is rendered.

FIG. 3 illustrates a script component in a JavaServer™ Faces framework in a data processing system, in accordance with an illustrative embodiment of the present invention. Data processing system 300 is a host server that stores, updates, and renders a webpage for at least one business entity. Data processing system 300 can be implemented as a server, such as server 104 or 106 of FIG. 1 or data processing system 200 of FIG. 2. In the illustrative embodiment, data processing unit 300 includes JavaServer™ Faces (JSF) framework 310, radiobutton component 320, button component 322, and script component 330. JavaServer™ is a trademark of Sun Microsystems, Inc. in the United States, other countries, or both. In the illustrative embodiment, all components in data processing unit 300 are implemented as software components executable in a processing unit, similar to processing unit 206 of FIG. 2.

JSF framework 310 is a webpage development framework or a server-side, Web application framework for building Web-based user interfaces in Java™. In other words, JSF framework 310 facilitates web developers with the development and management of a webpage. JSF framework 310 provides a set of standard components or attributes, including but not limited to buttons, hyperlinks, and checkboxes. JSF framework 310 also provides a set of tags to refer to the standard attributes. A tag is a reference to a set of instructions that can be used as a short-cut in developing a webpage. In other words, instead of writing each and every line of code to perform a particular function, a web developer can refer to the function, or the tag naming the function, to reference the set of code. JSF framework 310 allows a webpage developer to use existing tags as well as to create custom tags which are unique to the webpage developer. Furthermore, JSF framework 310 provides additional attributes to process client-based events or logic.

In the illustrative embodiment, JSF framework 310 includes JSF lifecycle 312 and data model 314. JSF lifecycle 312 is a six-step process for JSF framework 310 to process Hypertext Transfer Protocol (HTTP) requests. Specifically, in the illustrative embodiment, the HTTP requests are requests for a HyperText Markup Language (HTML) page, commonly known as a webpage.

The six-step process for JSF lifecycle 312 is (1) restore view; (2) apply request values; (3) process validations; (4) update model values; (5) invoke applications; and (6) render response. In the restore view step, JSF framework 310 either reconstructs a previously existing webpage or creates the attributes required to build a new webpage. In the illustrative embodiment, a view is a user interface representation of the webpage. Thus, to restore the view, JSF framework 310 receives a request from a client through a JSF servlet (not shown). The JSF servlet manages the lifecycle of the request for a webpage. Thus, the JSF servlet manages the processing of a request through JSF lifecycle 312 and provides the resources needed by JSF framework 310 to process the request. To process the request, the JSF servlet extracts a view identification from the request and identifies the attributes associated with the view identification. If the view identification exists and is not a new webpage, then JSF framework 310 builds a view of the webpage using the identified attributes. If, on the other hand, the view identification is a new webpage, then JSF framework 310 associates instructions or computer-usable program code to the attributes and prepares the view to be associated with the attributes. The code associated with attributes can include, for example, event handlers or validators.

In the apply request values step, JSF framework 310 applies the values transmitted in the request to each respective attribute in the view. For example, in the illustrative embodiment, consider a request from a client that includes a text field in which the user inputs data. In the apply request values step, JSF framework 310 receives the request, extracts the value from the request, associates the value with the respective attributes, and then stores the value in the attributes. In this example, the value would be some form of text.

In the process validation step, the values within each attribute are validated against validation rules for JSF framework 310. In other words, JSF framework 310 ensures that the values entered into each attribute are the correct type of value or are within a particular range. For example, JSF framework 310 ensures that a date field is populated with a date instead of text or that a text field is populated with text instead of symbols. The validation rules are typically established by the developer of the webpage when the webpage is initially created.

In the update model values step, JSF framework 310 updates the values in each attribute with the values stored in data model 314. Data model 314 is a server-side data structure and can be implemented using the main memory of data processing system 300, similar to main memory 208 of FIG. 2. Data model 314 can be in any format, including but not limited to a table, a flat file, an Extensible Markup Language (XML) file, a relational database management system, or any combination thereof. In the illustrative embodiment, data model 314 is a table. In the update model values step, JSF framework 310 updates the attributes with the values in the table in data model 314.

In the invoke application step, JSF framework 310 invokes the application to handle any form event. A form event is any action by a user that triggers a series of instructions or code in a webpage. Example form events include but are not limited to a user clicking a link or pressing a button in the webpage. A handler, or a set of instructions, is typically associated with the event. Thus, when a user triggers the form event, the webpage initializes the handler to begin executing the instructions for processing the form event. In the invoke application step, JSF framework 310 ties an attribute to a handler for each of the form events within each webpage.

In the render response step, JSF framework 310 creates a response and presents the response with all the attributes in the updated state to a user. In the illustrative embodiment, to render means to present a completed webpage to a client. The render response step occurs immediately before JSF framework 310 transmits or sends the response to the user. Thus, in the illustrative embodiment, JSF framework 310 presents the webpage that includes radiobutton component 320, button component 322, and script component 330.

In the illustrative embodiment, radiobutton component 320 and button component 322 are example attributes in the webpage and are presented as two concentric circles and an "OK" button, respectively. The illustrative embodiments are not limited to the illustrated components, but can be implemented as any other type of component, such as a hyperlink or a checkbox.

Script component 330 is an attribute that allows webpage developers to write scripts that contain dynamic expressions. A script is a line of computer logic or a single command in a computer program. A dynamic expression is a script which utilizes data that changes over time. The data can be stored as values in data model 314 or in any other storage device within JSF framework 310, such as a managed bean. The script in script component 330 defines the attribute represented by script component 330.

In the illustrative embodiment, script component 330 allows for dynamic client-side logic to be incorporated into a webpage. Client-side logic is a set of computer usable program code or script executed in a client computer. Client-side logic is embedded in the webpage and transmitted to the user as part of the response to the client. Thus, client-side logic is executed at the time the webpage is displayed and presented to the client. Client-side logic can be used to define an attribute or can be an event handler for a form event. As an event handler, client-side logic executes when the form event, such as the pressing of a key or the hovering of a mouse over an image, occurs.

Script component 330 is part of the component library stored within JSF framework 310. A component library is a library of all the standard attributes available to a web developer when creating a webpage. All components within the component library are subject to JSF lifecycle 312. Thus, when processing a request for a webpage, script component 330 will go through all six steps of JSF lifecycle 312.

In the illustrative embodiment, script component 330 includes a value-binding expression that defines the attribute represented by script component 330. A value-binding expression is a dynamic expression that binds values stored in a storage device to the script that refers to the value. To bind means to establish a reference or a location where the data for a particular script can be found. In the illustrative embodiment, the value-binding expression binds values stored in data model 314 to the script in script component 330.

Value-binding expressions are used when values are not available at the time the webpage is developed. Thus, the value is only available or obtained when the expression is executed during runtime. Thus, value-binding expressions are used because the values within the value-binding expression cannot be hard-coded into script component 330. For example, in the illustrative embodiment, consider a webpage for a bank. The bank would like to show an alert on an account to a customer when the customer's bank account is below a particular threshold. In this example, script component 330 contains a value-binding expression that triggers an alert in the webpage when the account is below the preset threshold. The account balance is not a fixed value and changes over time. Thus, in this example, data processing system 300 cannot determine whether the account balance is below the threshold until the account balance is requested by the customer. Once the customer requests the account balance, data processing system 300 can execute the value-binding expression to determine the account balance. Once the account balance is determined, then data processing system 300 can determine whether the account balance is below the threshold, and if so, trigger the alert for the customer.

In the illustrative embodiment, the value-binding expression is found in line 332. The text "dataModel" in line 332 refers to data model 314 and indicates that the current value for the value-binding expression is in data model 314. "wparType" is the specific class of data stored in data model 314 to which the value-binding expression refers. Thus, the value-binding expression in line 332 provides access to current values and data in data model 314. Therefore, when evaluating the value-binding expression, lifecycle 312 will extract current values from data model 314 to be input into the value-binding expression. In an alternative embodiment, "dataModel" can refer to a managed bean, and the managed bean can include the data included in data model 314. In yet another embodiment, instead of providing a value-binding expression, such as line 332, to be resolved at render time, script component 330 can use an existing script stored in the component library.

In the illustrative embodiment, script component 330 also includes additional script 335. Additional script 335 is rendered when the value-binding expression in script component 330 is evaluated. In other words, when script component 330 is initiated, the value-binding expression is evaluated or run. As part of evaluating the value-binding expression, additional script 335 is rendered or resolved. To resolve is to determine a value for a particular set of instructions. In the illustrative embodiment, a current value for additional script 335 is determined when additional script 335 is rendered or resolved. In the illustrative embodiment in line 337, the text "S" is the current value of the class "wparType".

In the illustrative embodiment, script component 330 resolves the value-binding expression as JSF framework 310 renders a response. Thus, in the illustrative embodiment, the render response step is a three-phase process: (1) create a response; (2) modify the response; and (3) present the response to a client. In the create a response phase, script component 330 initially evaluates the value-binding expression but does not resolve additional script 335. The evaluation only identifies that additional script 335 needs to be resolved at a later time. In the modify the response phase, additional script 335 is then resolved, and, in the illustrative embodiment, the current value of "S" is input into the value-binding expression.

In one embodiment, additional script 335 actually inputs the current value of "S" into the value-binding expression. In another embodiment, a determination is made during the evaluation that additional script 335 does not need to be resolved. Therefore, additional script 335 does not input any current value into the value-binding expression. As an example of such a determination, consider the example illustrated above of a bank triggering an alert for a customer if the account balance is below a preset threshold. If the value-binding expression in script component 330 determines that the account balance is above the threshold, then additional script 335 will not be resolved because additional script 335 is the script for displaying the alert to the customer. Thus, additional script 335 would only resolve if the account balance was below the threshold.

Thus, in use, in the illustrative embodiment, JSF framework 310 receives a request for a particular webpage. JSF framework 310 processes the request using JSF lifecycle 312. During the render response step, JSF framework 310 initiates instructions to build the webpage that includes radiobutton component 320 and button component 322. Additionally, JSF framework 310 initiates script component 330 to begin evaluating the value-binding expression in line 332. After the webpage is built, then JSF framework 310 resolves the value-binding expression with additional script 335. Additional script 335 retrieves the value of "wparType" from data model 314 and enters the value "S" into the value-binding expression in script component 330. JSF framework 310 then transmits and presents the completed webpage to the client.

The illustrative embodiments are not limited to the illustrative example. For example, data processing system 300 and JSF framework 310 can include more or fewer components. Additionally, any webpage development framework other than JSF framework 310 may be used to process a request for a webpage.

FIG. 4 depicts an example of scripting language in a script component, in accordance with an illustrative embodiment. Scripting language 400 can be implemented in script component 330 of FIG. 3. Scripting language 400 is a set of instructions or code for establishing an identification for a specific component in a webpage. Specifically, the exemplified script establishes an attribute identification for a wizard panel, referred to as "wizardPanelID" in line 410 of scripting language 400. Scripting language 400 is exemplary only and is not limited to the illustrative embodiment. In alternative embodiments, scripting language 400 can define a number of other attributes as well.

In the illustrative embodiment, an attribute identification includes the name of the attribute and the location for the attribute in the corresponding webpage. However, the attribute identification is not limited to the illustrative embodiment and can include other information as well. Attribute identifications change when a web designer changes the format of a webpage and moves the attribute to another location or another data model. The attribute identification can also change if additional attributes are added to the webpage and are associated with the identification for the wizard panel.

The exemplified script includes the value-binding expression "value="var#{utilityBean.portletNS}tPanel=ODCRegistry.getClientControl ('#{pc_CreateWWizard.wizard PanelID}', null); #{utilityBean.portletNS}tPanel.restoreUI State ('#{pc_CreateWWizard.panelToExited}')", which is found in lines 410 and 412. In the illustrative example, the value-binding expression is resolved when the webpage is rendered to the user.

Thus, in use for the illustrated example, a client requests a webpage from a webpage development framework, such as JSF framework 310 of FIG. 3. During the render response step, the webpage development framework initiates instructions to build the webpage which includes the wizard panel attribute. The webpage development framework evaluates the value-binding expression for the wizard panel attribute. The webpage development framework initiates script component 400 and evaluates the value-binding expression in line 410. The webpage development framework then builds the webpage and then resolves the value-binding expression with an additional script (not shown). The additional script then inputs the current value into the value-binding expression in line 410 and the webpage development framework then transmits and presents the completed webpage to the user.

Figure 5:
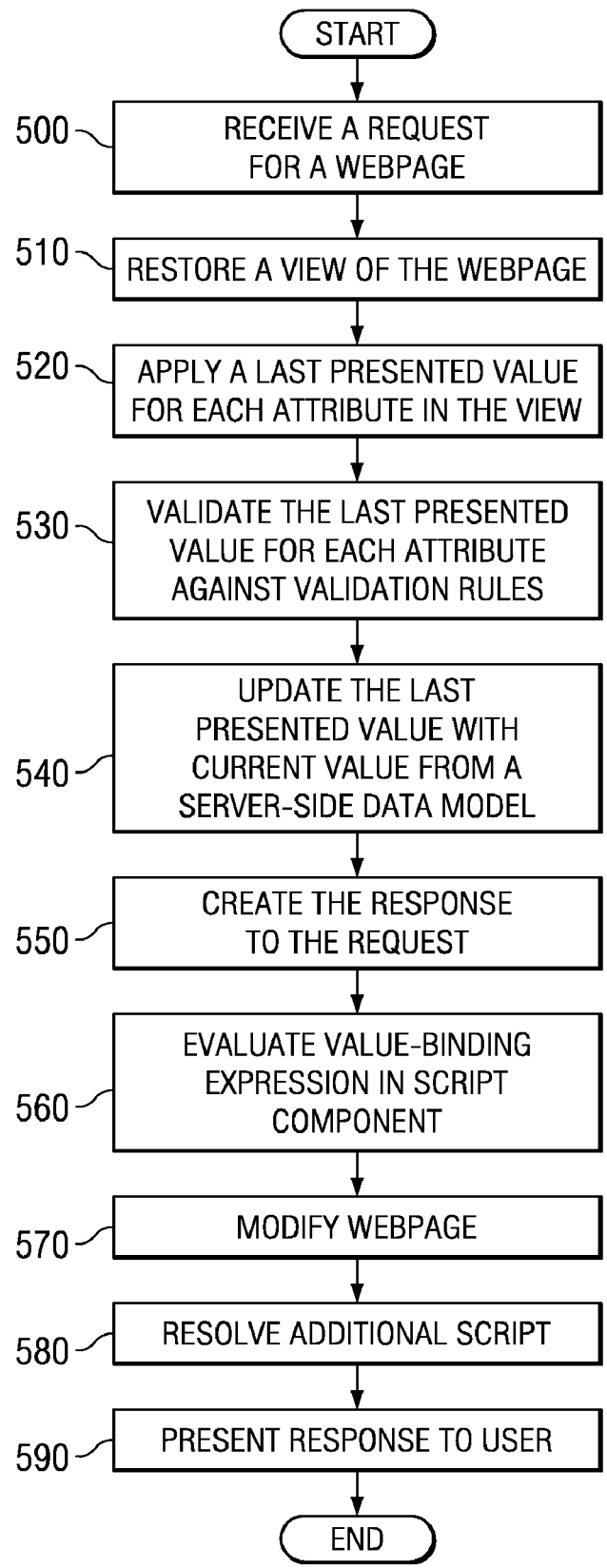
FIG. 5 illustrates the process for resolving client-side logic in a webpage when the webpage is rendered, in accordance with an illustrative embodiment.

FIG. 5 illustrates the process for resolving client-side logic in a webpage when the webpage is rendered, in accordance with an illustrative embodiment. The process may be implemented in a webpage development framework, such as JavaServer™ Faces Framework 310 of FIG. 3. The following process is exemplary only and the order of the steps may be interchanged without deviating from the scope of the invention.

The process begins with the webpage development framework receiving a request for a webpage (step 500). In these examples, the request originates from a client process, such as a browser. The request may come from other requesters, such as for example a web crawling process or some other server. The webpage development framework then restores a view of the webpage (step 510). To restore, the webpage development framework either builds a new view or builds a last presented view of the webpage. The last presented view of the webpage is the last webpage that was presented to the client prior to the present request being made. The webpage development framework then applies a last presented value for each attribute in the view (step 520). The last presented value is a value of the attribute which was presented to the client prior to the present request being made. The webpage development framework then validates the last presented value for each attribute against the validation rules (step 530). To validate, the webpage development framework determines the appropriate date type and data range assigned to the attribute using the validation rules. The validation step ensures that the last presented value was the correct type of data and the correct range.

The webpage development framework then updates the last presented value for each attribute with a current value from a server-side data model (step 540). The webpage development framework then creates the response to the request by building the webpage (step 550). Any value-binding expression in a script component is then evaluated (step 560). The value-binding expression defines the attribute that the script component represents. The webpage development framework then modifies the webpage based on the script component (step 570). The script component then resolves any additional script (step 580). The webpage development framework then presents the response to the user (step 590), with the process terminating thereafter.

Thus, a computer implemented method, an apparatus, and a computer usable program product for rendering client-side logic in a webpage when the webpage is rendered is provided. A webpage development framework initiates a script component built in a component library of a webpage development framework, wherein the script component is subject to a lifecycle of the webpage development framework. The component library comprises a set of computer usable program code currently existing in the webpage development framework.

The lifecycle of the webpage development framework includes restoring a view of a webpage requested by a client. The step of restoring is either building a new view or building a last presented view of the webpage. The second step of the lifecycle is to apply a last presented value for each attribute in the view. The last presented value is a value of the at least one attribute when the webpage was last previously rendered. The next step of the lifecycle is to validate the last presented value for each attribute in the view against the validation rules. The validation rules define the data type to be input into each attribute. The next step of the lifecycle includes updating the last presented value for each attribute. The webpage development framework obtains the current value from a server-side data model.

The webpage development framework defines at least one webpage attribute using at least one value-binding expression in the script component. The at least one value-binding expression provides access to a server-side data model. To provide access, the at least one value-binding expression binds a value in the at least one value-binding expression to a server-side data model.

The webpage development framework evaluates the at least one value-binding expression. The at least one value-binding expression includes a current value for the server-side data model. In response to evaluating the value-binding expression, the webpage development framework determines whether a scripting language should be rendered. In response to rendering the determination, the scripting language is rendered by extracting the current value from the server-side data model. The scripting language then inserts the current value into the value binding expression. The rendering of the scripting language occurs when a response to a request for a webpage is rendered.

Therefore, the illustrative embodiments provide a mechanism for incorporating values received subsequent to when a webpage is built. Furthermore, the illustrative embodiments provide for the values to be incorporated using a value-binding expression in a script component. In this manner, a user is able to view data that is current up to when the webpage is rendered to the user.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for rendering client-side logic in a webpage when the webpage is rendered, the computer implemented method comprising:
    initiating a script component built in a component library of a webpage development framework, wherein the script component is subject to a lifecycle of the webpage development framework, wherein the lifecycle of the webpage development framework comprises:
    restoring a view of the webpage requested by a client, wherein the step of restoring comprises at least one of building a new view and building a last presented view of the webpage;
    applying a last presented value for each attribute in the view, wherein the last presented value is a value of the at least one attribute when the webpage was last rendered;
    validating the last presented value for the each attribute against validation rules which define the data type to be input in the each attribute; and
    updating the last presented value for the each attribute with a current value from the server-side data model;
    defining at least one webpage attribute using at least one value-binding expression in the script component, wherein the at least one value-binding expression provides access to a server-side data model; and
    evaluating the at least one value-binding expression, wherein the at least one value-Binding expression comprises a current value for the server-side data model.

2. The computer implemented method of claim 1, further comprising:
    responsive to evaluating the at least one value-binding expression, determining whether a scripting language should be rendered.

3. The computer implemented method of claim 1, wherein the step of evaluating the at least one value-binding expression comprises:
    rendering a scripting language that extracts the current value from the server-side data model, wherein the scripting language inserts the current value into the value-binding expression.

4. The computer implemented method of claim 3, wherein the step of rendering a scripting language resolves when a response to a request for the webpage is rendered.

5. The computer implemented method of claim 1, wherein the value-binding expression providing access to the server-side data model comprises:
    binding a value in the at least one value-binding expression to the server-side data model.

6. The computer implemented method of claim 1, wherein the component library comprises a set of computer usable program code currently existing in the webpage development framework.

7. A data processing system comprising:
    a script component embedded in a webpage, wherein the script component is built in a component library of a webpage development framework, and wherein the script component is subject to a lifecycle of the webpage development framework, and wherein the webpage development framework initiates the script component;
    at least one webpage attribute defined using at least one value-binding expression in the script component; and
    the least one value-binding expression in the script component provides access to a server-side data model, wherein the webpage development framework evaluates the at least one value-binding expression, and wherein the at least one value-binding expression comprises a current value for the server-side data model.

8. The data processing system of claim 7, wherein the webpage development framework determines whether a scripting language should be rendered in response to evaluating the value-binding expression.

9. The data processing system of claim 8, further comprising:
    the scripting language coupled to the script component, wherein the scripting language extracts a current value from the server-side data model in response to the scripting language being rendered, and wherein the scripting language inserts the current value into the value-binding expression.

10. A computer program product comprising a non-transitory computer usable medium including computer usable program code for rendering client-side logic in a webpage, the computer program product comprising:

computer usable program code for initiating a script component built in a component library of a webpage development framework, wherein the script component is subject to a lifecycle of the webpage development framework, wherein the lifecycle of the webpage development framework comprises:

computer usable program code for restoring a view of the webpage requested by a user, wherein restoring a view of the webpage requested by the user comprises at least one of building a new view and building a last presented view of the webpage;

computer usable program code for applying a last presented value for each attribute in the view, wherein the last presented value is a value of the at least one attribute when the webpage was last rendered;

computer usable program code for validating the last presented value for the each attribute against validation rules which define the data type to be input in the each attribute; and computer usable program code for updating the last presented value for the each attribute with a current value from the server-side data model;

computer usable program code for defining at least one webpage attribute using at least one value-binding expression in the script component, wherein the at least one value-binding expression provides access to a server-side data model; and computer usable program code for evaluating the at least one value-binding expression, wherein the at least one value-binding expression comprises a current value for the server-side data model.

11. The computer program product of claim 10, further comprising:

responsive to evaluating the value-binding expression, computer usable program code for determining whether the scripting language should be rendered.

12. The computer program product of claim 10, wherein the computer usable program code for evaluating the at least one value-binding expression comprises:

computer usable program code for rendering a scripting language that extracts the current value from the server-side data model, wherein the scripting language inserts the current value into the value-binding expression.

13. The computer program product of claim 12, wherein the computer usable program code for rendering a scripting language resolves when a response to a request for the webpage is rendered.

14. The computer program product of claim 10, wherein the value-binding expression providing access to the server-side data model comprises:

computer usable program code for binding a value in the at least one value-binding expression to the server-side data model.

15. The computer program product of claim 10, wherein the component library comprises a set of computer usable program code currently existing in the webpage development framework.

16. A data processing system comprising:

a means for initiating a script component built in a component library of a webpage development framework, wherein the script component is subject to a lifecycle of the webpage development framework, wherein the lifecycle of the webpage development framework comprises:

a means for restoring a view of the webpage requested by a client, wherein the step of restoring comprises at least one of building a new view and building a last presented view of the webpage;

a means for applying a last presented value for each attribute in the view, wherein the last presented value is a value of the at least one attribute when the webpage was last rendered;

a means for validating the last presented value for the each attribute against validation rules which define the data type to be input in the each attribute; and a means for updating the last presented value for the each attribute with a current value from the server-side data model;

a means for defining at least one webpage attribute using at least one value-binding expression in the script component, wherein the at least one value-binding expression provides access to a server-side data model; and a means for evaluating the at least one value-binding expression, wherein the at least one value-binding expression comprises a current value for the server-side data model.

17. The data processing system of claim 16, further comprising:

responsive to evaluating the at least one value-binding expression, a means for determining whether the scripting language should be rendered.

18. The data processing system of claim 16, wherein the means for evaluating the at least one value-binding expression comprises:

a means for rendering a scripting language that extracts the current value from the server-side data model, wherein the scripting language inserts the current value into the value-binding expression.

\* \* \* \* \*